D. S. JACOBUS.
APPARATUS FOR REGULATING THE TEMPERATURE OF SUPERHEATED STEAM.
APPLICATION FILED JUNE 11, 1915.
1,231,895. Patented July 3, 1917.
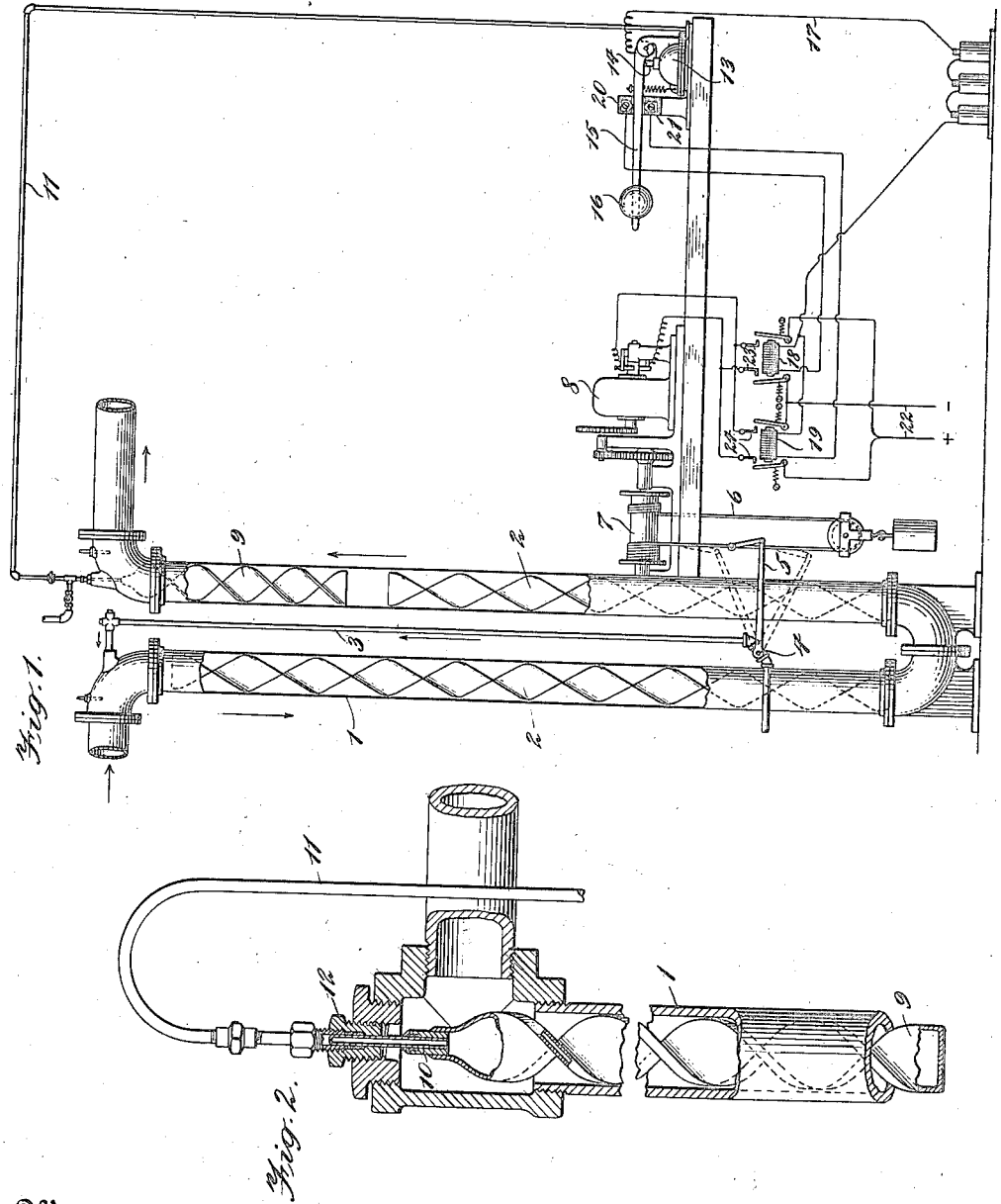

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

APPARATUS FOR REGULATING THE TEMPERATURE OF SUPERHEATED STEAM.

1,231,895. Specification of Letters Patent. Patented July 3, 1917.

Original application filed May 24, 1909, Serial No. 498,012. Divided and this application filed June 11, 1915. Serial No. 33,516.

*To all whom it may concern:*

Be it known that I, DAVID S. JACOBUS, a citizen of the United States, residing at Jersey City, in the county of Hudson and State of New Jersey, have invented certain new and useful Improvements in Apparatus for Regulating the Temperature of Superheated Steam, of which the following is a specification.

The object of my invention is to establish and maintain either a practically constant temperature in superheated steam, where so desired, or a temperature which may be made to vary to meet certain conditions of service. This object of reducing the amount of fluctuation in the temperature of superheated steam, to a degree which will prevent any danger from an excess of superheat, is accomplished by first bringing the temperature of the steam to a substantial constant, and then causing the steam, after its temperature has been modified, to act upon a thermostat which latter may be in the form of a closed vessel, which I have termed an "evaporator," containing air or other gas, or a volatile liquid, or which may be one depending upon the unequal expansion of different metals, and utilizing the pressure generated in the evaporator by the heat of the superheated steam, or the expansion or contraction of the metals, to control the temperature of the steam.

The present application is a division of my Patent 1,149,265 dated August 10, 1915, application for which was filed May 24, 1909, and is designed more particularly to cover the use of a thermostat to vary the action of a motor to control the supply of the tempering fluid.

The invention will be understood by reference to the accompanying drawings in which Figure 1 is a view in elevation, with some of the parts broken away, of an apparatus for practising my invention; and Fig. 2 is a view on an enlarged scale, and broken away, of one form of a thermostat which may be used. Similar reference numerals indicate similar parts in the several views.

I have termed my apparatus an "attemperator" and in the form shown this consists of a U-shaped tube 1 to which steam of a varying initial temperature is admitted from a superheater, the flow of the steam being indicated by arrows. In one or both legs of the attemperator is placed a band of sheet metal 2 twisted spirally throughout its length to cause the superheated steam, while passing through the attemperator, to take a spiral path. Connected to the attemperator near its inlet, is a pipe 3 through which a cooling medium such as water or saturated steam is admitted to the superheated steam. In the pipe 3 is a valve 4 to which is attached an operating lever 5 connected to the rope 6 of a windlass 7. The latter is driven by an electric motor 8 in one direction to open the valve, and in the opposite direction to close it, according to the temperature requirements. When the apparatus is started the valve 4 is adjusted to admit a sufficient volume of water or saturated steam to reduce the degree of superheat to a predetermined constant, and the desired degree of superheat is maintained substantially constant by the following means.

In the upper part of the outlet section of the attemperator is a thermostat which, in the form shown, consists of a closed pipe containing a volatile liquid, such as water, alcohol or mercury, having a fixed boiling point for a given pressure. This I have termed an "evaporator." It may be given any appropriate form which will insure a relatively large heating surface and a small internal volume. I have used a flattened sheet metal tube 9 spirally twisted which gives the desired surface, and at the same time spreads out the contained liquid or causes it to contact with a large surface which aids or facilitates its evaporation, and renders such liquid extremely sensitive to variations in the temperature of the surrounding steam. The evaporator is closed at its upper end by a plug 10 adapted to receive one end of a pipe 11. The latter passes through a stuffing box seated in a bushing 12, and leads to a regulator or governor 13 of well known construction. This governor comprises a chamber having a flexible diaphragm therein which receives on its underside, from pipe 11, the pressure generated in the evaporator. Secured to the diaphragm is a stem 14 which bears against a lever 15 which latter carries an adjustable weight 16. The lever 15 is included in a circuit 17, which circuit also includes two electro-magnets 18 and 19, and the contacts 20 and 21. When the apparatus is started the weight 16 is so adjusted that the lever 15 will be in a neutral position, that is, out of engagement with contacts 20 and 21. When the steam temperature exceeds the predetermined constant, thereby increasing the pressure generated in the evaporator, lever 15 will be raised and will close circuit 17 through contact 20 thereby energizing magnet 18. When the armatures of the latter are attracted the motor circuit 22 will be closed through contacts 23 thereby rotating the motor in such direction as to raise lever 5 and thereby opening the valve 4 to admit a volume of water or saturated steam to the attemperator necessary to restore the temperature of the superheated steam to substantially that of the constant. On the other hand, should the temperature of the superheated steam fall below the constant, the pressure in the evaporator 9 will fall, thereby causing the lever 15 to engage contact 21, closing circuit 17 through magnet 19. When the latter is energized the motor circuit 22 will be closed through contacts 24 to thereby rotate the motor 8 in the direction to close the valve 4. The closure of valve 4 may be complete or only partial as may be necessary under the conditions of steam temperature required.

When the apparatus is started the valve 4 is adjusted to admit a sufficient volume of the cooling medium to reduce the degree of superheat to the predetermined constant. The action of the apparatus, thereafter, is to cause the vapor pressure in the evaporator 9 to act through the regulator in such manner that when there is an excess of temperature in the outgoing steam, the increase of pressure generated in the evaporator will cause the lever 5 to move in one direction to admit an additional volume of the cooling medium to the attemperator, and thus reduce the temperature of the steam passing through the attemperator to the predetermined normal or constant degree. On the other hand, should the temperature of the outgoing steam fall below the normal or constant degree the pressure of the vapor in the evaporator 9 will fall and the valve 4 will be moved in an opposite direction to reduce the volume of the cooling medium admitted to the attemperator, and thus prevent any lowering of the steam temperature below that at which the apparatus is set.

What I claim and desire to secure by Letters Patent of the United States is:—

1. In combination, an attemperator to which superheated steam of a varying initial temperature is admitted, a pipe for admitting a fluid to the attemperator to modify the temperature of the superheated steam, a valve in said pipe, a thermostat placed in the path of the steam after it leaves the attemperator, a circuit controlled by said thermostat, and mechanism actuated upon the closing of the circuit to determine the position of said valve to vary the flow of said fluid without restricting the flow of the superheated steam from the boiler.

2. In combination, an attemperator to which superheated steam of a varying initial temperature is admitted, a pipe for admitting a fluid to the attemperator to modify the temperature of the superheated steam, a valve in said pipe, a closed evaporator containing a volatile liquid placed in the path of the steam after it leaves the attemperator, means for utilizing the vapor pressure in the evaporator to close a circuit, and mechanism actuated upon the closing of said circuit to determine the position of said valve to vary the flow of said fluid without restricting the flow of the superheated steam from the boiler.

3. In combination, an attemperator to which superheated steam of a varying initial temperature is admitted, means for admitting a fluid to the attemperator to modify the temperature of the superheated steam, a motor and means actuated thereby to govern the volume of said fluid, a thermostat in the path of the steam after it leaves the attemperator, a circuit including normally open contacts, and means actuated by said thermostat to close the circuit to thereby rotate the motor and to adjust the position of the valve to vary the flow of said fluid without restricting the flow of the superheated steam from the boiler.

DAVID S. JACOBUS.

Witnesses:
 EDITH CAMP,
 E. J. HAYES.